Dec. 6, 1927.
C. G. ADSIT
1,652,083
DRIVE FOR AUTOMOTIVE VEHICLES
Original Filed Oct. 1, 1925
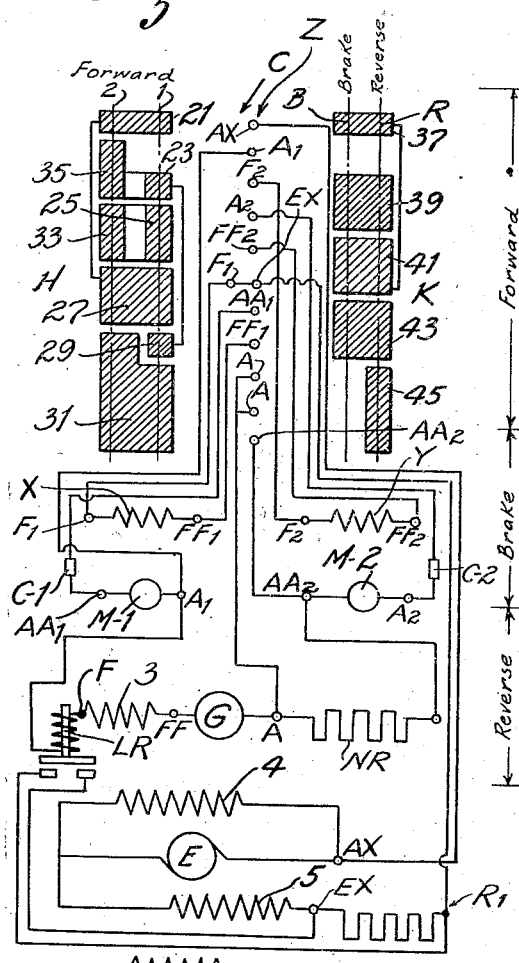
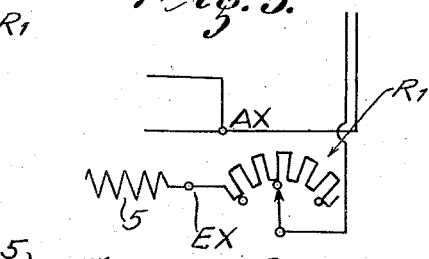
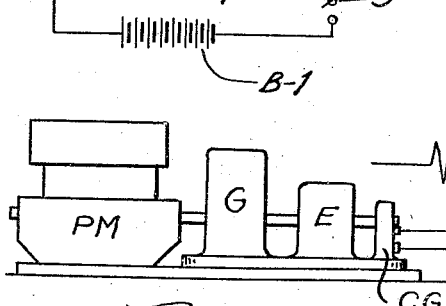
Charles G. Adsit.
Inventor,
Deloz G. Haynes,
Attorney Patented Dec. 6, 1927.

1,652,083

UNITED STATES PATENT OFFICE.

CHARLES G. ADSIT, OF ATLANTA, GEORGIA, ASSIGNOR TO WALTER J. CUMMINGS, OF CHICAGO, ILLINOIS.

DRIVE FOR AUTOMOTIVE VEHICLES.

Application filed October 1, 1925, Serial No. 59,755. Renewed May 13, 1927.

This invention relates to electric circuits, and with regard to certain more specific features, to circuits for power generating and utilizing apparatus.

Among the several objects of the invention may be noted the provision of means for readily adapting a given design of generator of originally given electrical characteristics to be driven advantageously by any of a number of engines having various and different power-producing characteristics; the provision of a generator circuit whereby the speed range of a generator may be changed without varying its designed range of energy output; and, the provision of a power control for increasing the engine speed (and output) when the generator current is above a predetermined value, as during acceleration and other times of heavy torque demand. Other objects will be in part obvious and in part pointed out hereinafter.

The invention accordingly comprises the elements, features of construction, and arrangements of parts which will be exemplified in the structure hereinafter described, and the scope of the application of which will be indicated in the following claims.

In the accompanying drawings in which are illustrated two of various possible embodiments of the invention, Fig. 1 is a circuit diagram showing a circuit and a controller circuit therefor;

Fig. 2 is a diagram representing the connections attainable in Fig. 1 by moving the controller blocks to the positions indicated with respect to the circuit terminals;

Fig. 3 is a fragmentary view of Fig. 1 showing the application of an adjustable resistance for a fixed type of resistance; and Fig. 4 is a diagrammatic view of certain parts of Fig. 1.

Similar reference characters indicate corresponding parts throughout the several views of the drawings.

Referring now more particularly to Fig. 1 of the accompanying drawings, there is illustrated, by way of example, the connections for an electric drive for gasoline busses using a gasoline prime mover, a direct connected generator, a separate exciter operable by said engine, either on the generator shaft or otherwise (see Fig. 4), and electric motors for driving the busses which receive their energy from the generator.

The detailed connections and construction are as follows:

A main generator G has a separately excited field 4 and a series opposing field 3. An exciter E energizes the field 4. The exciter E has its own field 5 and a teaser field 7. The field 7 is operable from a battery $B^1$ through a snap switch S.

An engine or prime mover PM (Fig. 4) is directly coupled to the generator and the exciter E. A gas engine of the Otto or internal combustion type such as is ordinarily used in bus service is here used, altho any type of engine may be employed.

Terminals EX and AX of the exciter E have extensions leading to the controller C. These extensions have controller terminals marked with numerals indicating what point they lead from. For instance, the exciter terminals AX and EX have extension controller terminals $A^x$ and $E^x$ respectively.

The above indicated methods of applying numerals will be employed throughout this specification for purposes of simplification.

In the circuit of the exciter field 5 is placed a non-inductive resistance $R_1$ which may be either of the fixed form such as a cartridge type, or it may be introduced in the familiar form known as a field rheostat. The latter is adjustable and is diagrammatically illustrated in Fig. 3. Other means for adjusting the rheostat will be indicated later.

The introduction of the above indicated resistance $R_1$ comprises a major part of this invention and its purposes will be indicated later herein.

Referring again to the generator G it will be noted that its differential or series opposing field 3 lies between points F and FF. The point FF connects with the generator windings and the point F with the terminal $A_1$ of a driving motor $M^1$. Between the points F and A, is connected a low-current relay LR. The terminal $A_1$, has a connection to the controller C. The other terminal $AA_1$, of the motor $M^1$ has also a connection with the controller C. A cutout $C^1$ is placed in the motor circuit for the usual purposes.

Terminal $F_1$, and $FF_1$, and extensions therefor are provided in the controller C for energizing the field X of motor $M^1$.

Reverting again to generator G, it has connected extension terminals A, two of which are in the controller C. The other terminal A joins with the extension terminals $AA_2$ of a second motor M², one of which terminals lies in the controller C. In the line between terminals A and AA₂, is placed a non-inductive resistance NR.

The other side of motor M² is provided with extension terminals A², one of which lies in the controller C. A cutout C² is placed in the circuit of the motor M² for the usual purposes.

The field Y for motor M² has extension terminals F₂ and FF₂ with connections therefor in the controller C.

The controller C comprises suitable rows H and K of connector blocks adapted to cooperate with the said extension terminals within the controller for the purpose of making connections illustrated in Fig. 2.

The row H comprises a line 1 of blocks comprising blocks 21, 23, 25, 27, 29 and 31. It also comprises a line 2 of blocks 21, 35, 33, 27, and 31.

The row K comprises a line R of blocks 37, 39, 41, 43 and 45. It also comprises a line B of blocks 37, 39, 41 and 43.

The drawings are conventional and it is to be understood that the said rows of blocks are adapted to cooperate with the said extension terminals according to the horizon-relationships indicated in Fig. 1. Blocks 21 and 27 are electrically connected, as well as blocks 23 and 29 and blocks 37 and 41.

Assuming that the described assembly is to be applied to a motor bus or coach, the following should be noted. The motor, Fig. 4, drives the generator G and exciter E. The generator G drives the motors M¹ and M² which in turn drive or propel the coach. Any other application beside that to a motor coach would respond to the actions and principles herein recited.

The line of blocks 1 (Fig. 1) when set on the recited row Z of extension terminals will produce the connections illustrated at 1 in Fig. 2. This represents first speed forward.

The line of blocks 2 (Fig. 1) when set on the said row Z of extension terminals will produce the connections illustrated at 2 in Fig. 2. This represents second speed forward.

The line of blocks B (Fig. 1) when set on the said row Z of extension terminals will produce the connections illustrated at B in Fig. 2. This represents application of brakes.

The line of blocks R (Fig. 1) when set on the said row Z of extension terminals will produce the connections illustrated at R in Fig. 2. This represents reverse speed.

The connections shown in Fig. 2 do not include the exciter connections.

This exciter circuit is closed for reverse or brake positions as well as on forward speeds because the extension terminals AX and EX are in closed circuit both when the blocks 21 and 27 contact therewith at the forward speed positions of the controller C and when the blocks 37 and 41 contact therewith at reverse and brake speeds. The said blocks 21 and 27 are in electrical connection and also the blocks 37 and 41. Hence terminals AX and EX contact at all speeds and exciter current is had.

Fig. 2 clearly represents the circuits for positions 1, 2, B and R of the controller C.

In position 1 the motors and fields therefor are in series and the non-inductive resistance NR is cut out.

In position 2 the motors and fields therefor are in parallel and the non-inductive resistance NR is cut out.

In positions 1 and 2 the exciter field 5 is in a closed circuit and operable. (See blocks 21, 27, Fig. 1).

In position B the motors and fields therefor are in series as well as the non-inductive resistance NR.

In position R the motors and fields therefor are in series and the non-inductive resistance NR is in parallel connection with said series.

In positions B and R the exciter field 5 is in a closed circuit and operable. (See blocks 37 and 41).

The foregoing circuits need little explanation (disregarding the resistance NR) in so far as they represent the usual methods for controlling the types of motors therein contemplated.

A novel feature of this invention is the introduction of the resistance $R_1$ into the exciter field circuit. The action of the circuit is briefly as follows:

At idle speed no current flows from the generator to its load. At other speeds the load on the generator comprises the motors that drive the vehicle. These are electrically connected to the generator at all times, with no intermediate rheostats (Fig. 2).

When the motors are at rest, the starting current is heavy, at low voltage, owing to the weak generator field, which at this time, consists of a weak separately excited shunt field 4 and a strong opposing series field.

As the car starts, the counter electromotive force of the motor reduces the counter action of the generator series field upon the total generator field strength, giving a stronger generator field, which makes the generator voltage higher and also its current; therefore, we have substantially a constant load on the generator, which means substantially a constant load on the engine.

The introduction of the resistance $R_1$ (fixed or variable) in the exciter field circuit, as shown, changes the range of movement of the generator excitation by reducing the strength of the generator field 4.

The resistance is of a value predetermined at the time the generator and engine are put together and first tested, and makes it practicable to run a given generator with one or another engine with the same effectiveness, even though the different engines have different speed-power characteristics.

As an example, 30 ohms of non-inductive resistance is used for the field $R_1$ on the exciter having a resistance of 57 ohms and used with a 25 kilowatt separately excited compound wound direct connecting generator for automotive vehicles.

The insertion of this resistance $R_1$ requires the generator to be run at 1350 revolutions per minute for sixty horsepower delivered from the generator instead of at 1200 revolutions per minute for the same power applied from the generator without the resistance R, and results in increased generator output above its value theretofore, to meet increased torque demand.

This is an advantage because at the higher speed than its value theretofore the engine delivers more power output. The speed-power curve of most gas engines is a rising one up to certain excessive speed limits.

The reason for the speeding up of the engine is that the insertion of the resistance weakens the field 4; and therefore the engine has to speed up the generator in order for the generator armature to cut the same number of lines of force that it did before, in other words, the engine and generator have to run at a higher speed in order to deliver the same voltage.

The fact that the engine is running at a higher and/or far more advantageous or efficient engine speed than the generator would otherwise permit for a given power output, if the resistance R were not used, makes the present system of power control of great advantage where it is desired to build a given design of generator and apply thereto engines of varying speed-power characteristics. All that need be varied in the design is the resistance R.

The introduction of this resistance will make it possible to utilize engines with fixed horse power characteristics without the necessity of designing and building a generator with characteristics different for the different characteristics of different makes of engines.

The insertion of the resistance also has the same effect, particularly in reference to its application to a self-propelled vehicle, as though the gear ratio were varied between the engine and the propelling wheels. In other words, the engine automatically attains a higher speed when the generator current is above a predetermined value.

Furthermore, when the engine is running at its increased speed, say such as for example 1350 revolutions per minute as noted above, then its power for accelerating the vehicle is increased. Hence in the above noted example the acceleration of a vehicle from zero to twenty miles per hour without the resistance R required twenty-five seconds, while with the resistance in place only twenty seconds was required.

It is to be understood that the resistance $R_1$ may be partly and/or wholly eliminated either manually, and/or automatically above predetermined engine speed (see Figs. 3 and 4). Any centrifugal or other speed responsive device such as diagrammatically shown at CG, Fig. 4, may be used to variably or otherwise adjust the resistance $R_1$. The resistance $R_1$ may be eliminated, partly and/or wholly when the generator current is below predetermined values by introducing a low current relay LR across the terminals of resistance $R_1$ (see Fig. 1). Thus, when the generator current drops to a predetermined value, as, for example, toward the end of the acceleration of the vehicle the resistance $R_1$ is automatically eliminated, thus restoring the generator to its original running condition. The relay LR may be used to variably or otherwise adjust the resistance $R_1$ and comprises a conventional relay of the desired type. It is at the relatively low speeds that the better accelerative qualities of a gas engine are lacking.

It should be noted also that incidentally to reducing the generator voltage at a given speed, the less voltage the generator field 4 has, the more current the generator can deliver for a given maximum of power, and at the time of starting, current is what is needed at the motors.

It is also to be understood that the resistance $R_1$ could be put into the circuit of the generator field 4 directly, but this involves greater energy loss at the resistance; and it is desirable to keep this as low as possible.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A power control for automative vehicles having an engine, a generator driven thereby, and a motor propelling the vehicle and energized from the generator; said control comprising generator-current-responsive means for increasing the engine speed above its value theretofore, when the generator current attains a predetermined value.

2. A power control for automative vehicles having an engine, a generator driven thereby, and a motor propelling the vehicle and energized from the generator; said control comprising generator-current-responsive means for increasing the engine output above its value theretofore, when the generator current attains a predetermined value.

3. A power control for automotive vehicles having an engine, a generator driven thereby, and a motor propelling the vehicle and energized from the generator; said control comprising generator-current-responsive means for weakening the generator excitation while the generator current is above a predetermined value, thereby permitting and causing the engine to maintain a higher speed than when the generator current is below said value.

4. A power control for automotive vehicles having an engine, a generator driven thereby, and a motor propelling the vehicle and energized from the generator; said control comprising generator-current-responsive means for increasing the generator speed above its value theretofore, when the torque demand increases.

5. A power control for automotive vehicles having an engine, a generator driven thereby, an exciter for the generator, and a motor propelling the vehicle and energized from the generator; said control comprising generator-current-responsive means for weakening the exciter excitation while the generator current is above a predetermined amount, thereby permitting and causing the engine to maintain a higher speed than when the generator current is below said value.

6. A power control for automotive vehicles having an engine, a generator driven thereby, and a motor propelling the vehicle and energized from the generator; said control comprising a relay responsive to a predetermined generator current to weaken the generator excitation while the generator current is above a predetermined amount, thereby permitting and causing the engine to deliver increased power while the generator current is above a predetermined value.

7. A power control for automotive vehicles having an engine, a generator driven thereby, and a motor propelling the vehicle and energized from the generator; said control comprising a relay responsive to a predetermined generator current to weaken the generator excitation while the generator current is above a predetermined amount, thereby maintaining a higher engine speed and permitting and causing the generator to deliver increased power while the generator current is above said predetermined amount.

8. A power control for automotive vehicles having an internal combustion engine and generator driven thereby and a motor propelling the vehicle and energized from the generator, said control comprising a relay responsive to a predetermined generator current and adapted to weaken the generator excitation while the generator current is above a predetermined amount, allowing the engine to increase its speed proportionately and thereby increase the power delivered to the generator while the generator current is above a predetermined value.

In testimony whereof, I have signed my name to this specification this 23d day of September, 1925.

CHARLES G. ADSIT.